(12) United States Patent
Spokoyny

(10) Patent No.: US 6,264,905 B1
(45) Date of Patent: Jul. 24, 2001

(54) METHOD AND APPARATUS FOR REDUCING "AMMONIA SLIP" IN SCR AND/OR SNCR NOX REMOVAL APPLICATIONS

(75) Inventor: Felix E. Spokoyny, Costa Mesa, CA (US)

(73) Assignee: Hera, LLC, Lake Forest, CA (US)

( * ) Notice: Subject to any disclaimer, the term of this patent is extended or adjusted under 35 U.S.C. 154(b) by 0 days.

(21) Appl. No.: 09/416,665

(22) Filed: Oct. 12, 1999

(51) Int. Cl.[7] .................................................. C01C 3/00
(52) U.S. Cl. .................... 423/237; 423/235; 423/239.1
(58) Field of Search ........................... 423/235, 239.1, 423/237

(56) References Cited

U.S. PATENT DOCUMENTS

| | | | |
|---|---|---|---|
| 5,145,652 | * 9/1992 | Veser et al. | 422/171 |
| 5,233,934 | * 8/1993 | Krigmont et al. | 110/345 |
| 5,237,939 | * 8/1993 | Spokoyny et al. | 110/345 |
| 5,238,890 | * 8/1993 | Hayasaka et al. | 502/61 |
| 5,310,714 | * 5/1994 | Grasselli et al. | 502/64 |
| 5,403,809 | * 4/1995 | Miller et al. | 502/413 |
| 5,603,909 | * 2/1997 | Varner et al. | 423/239.1 |

* cited by examiner

Primary Examiner—Steven P. Griffin
Assistant Examiner—Jonas N. Strickland
(74) Attorney, Agent, or Firm—Howard E. Sandler

(57) ABSTRACT

A method and apparatus for reducing the amount of unused ammonia ("ammonia slip") in instances where ammonia is provided to SNCR and/or SCR processes for reducing NOx pollution in flue gas produced by a fossil fuel burning facility. Such a facility incorporates a regenerative heat exchanger (i.e. an air preheater) for absorbing heat on the flue gas side, and releasing such absorbed heat to heat the incoming combustion air. The invention herein includes absorbent/desorbent media carried by at least some of the heat transfer elements of the heat exchanger. The media is active to adsorb at least a portion of the ammonia slip before the flue gas stream is exhausted to the environment, and to desorb essentially an equilibrium portion of such adsorbed ammonia into the incoming combustion air.

20 Claims, 1 Drawing Sheet

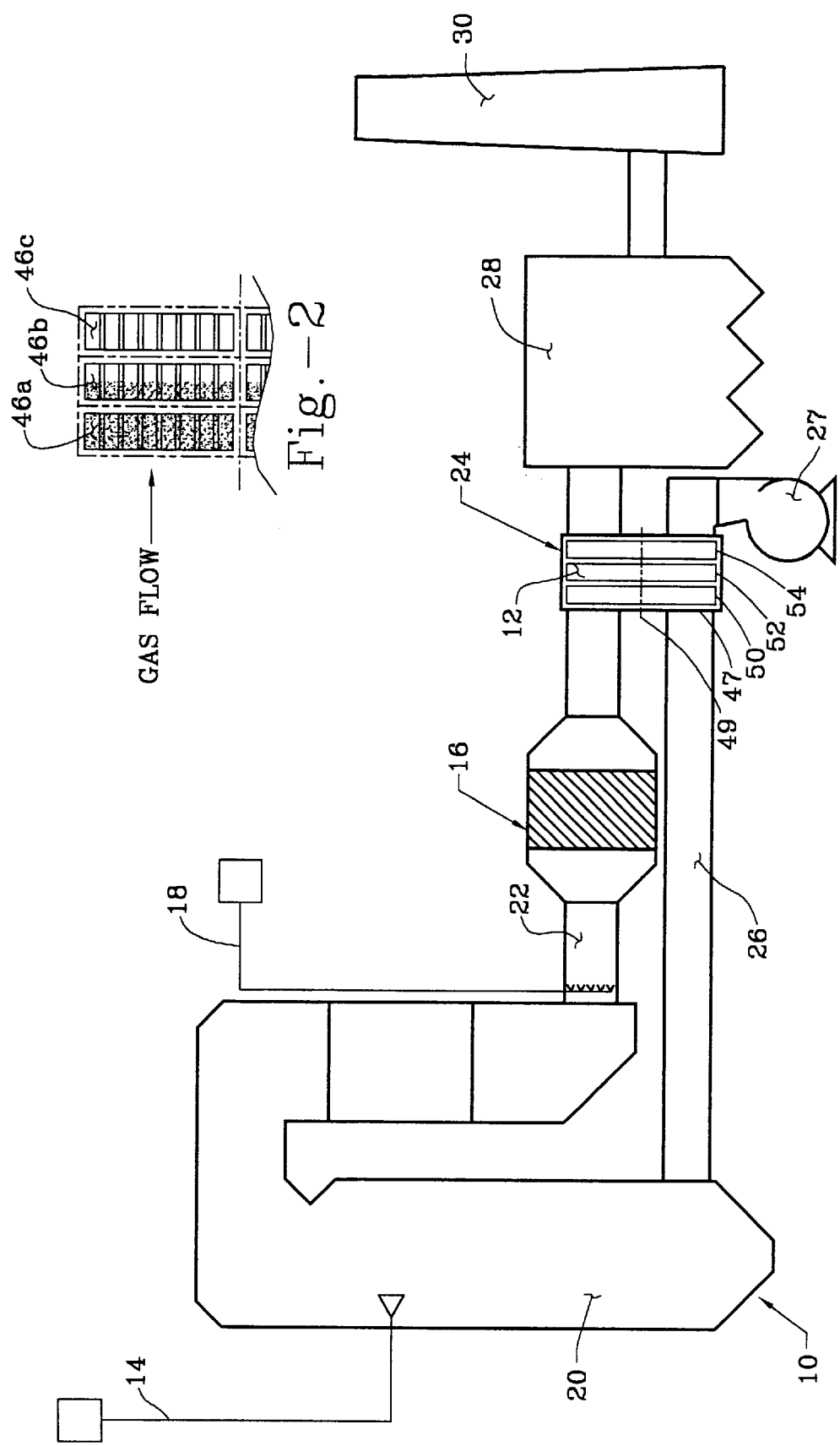

METHOD AND APPARATUS FOR REDUCING "AMMONIA SLIP" IN SCR AND/OR SNCR NOX REMOVAL APPLICATIONS

FIELD OF THE INVENTION

The invention relates generally to a method and apparatus for reducing ammonia slip to the atmosphere through adsorption/desorption at the air preheater, while simultaneously relieving the air heater pluggage due to ammonia sulfate and bisulfate formation and, further, to reduce the amount of ammonia attaching to the flyash collected by precipitators or baghouses.

The ammonia slip occurs from the ammonia which is used in SCR and/or SNCR process for NOx removal, but which is not totally consumed when passing through these process sections.

BACKGROUND OF THE INVENTION

Much of the electrical power used in homes and businesses throughout the world is produced in power plants that burn a fossil fuel (i.e. coal, oil, or gas) in a boiler. The resulting hot exhaust gas (also sometimes termed "flue gas") turns a gas turbine or boils water to produce steam, which turns a steam turbine, and the turbine cooperates with a generator to produce electrical power. The flue gas stream is passed through an air preheater, such as a rotating wheel heat exchanger, that transfers heat from the flue gas to an incoming air stream, that thereafter flows to the combustor. The partially cooled flue gas is directed from the air preheater to the exhaust stack.

An important consideration for modern power plants is the cleanup of the exhaust gas. The exhaust gas produced in the boiler contains gaseous pollutants such as nitrogen oxides ("NOx") and sulfur oxides ("SOx"), as well as particulates termed "fly ash". Environmental laws establish permissible levels of gaseous pollutants and particulates that may be emitted from the exhaust stack of the plant. Various types of pollution control equipment are available to reduce the levels of gaseous pollutants and particulates from the flue gas before it reaches the exhaust stack. For example, among other methods, NOx is often removed by selective catalytic reduction (SCR) and/or selective non-catalytic reduction (SNCR), and fly ash is often removed by an electrostatic precipitator (ESP) and/or a baghouse. The invention herein deals with those particular pollution control systems which utilize ammonia within the process in order to initiate, cause and/or supplement the removal of NOx, and in particular SCR, SNCR and/or staged systems (i.e. systems which include one or more SCR or SNCR systems).

To remove the NOx, a nitrogenous compound, such as ammonia, is injected into the flue gas stream. The ammonia reacts with the NOx to form nitrogen and water, reducing the NOx content of the flue gas. The reaction of ammonia and NOx may be performed at high temperature without a catalyst, a process termed "selective non-catalytic reduction" (SNCR), or at lower temperature in the presence of a catalyst, a process termed "selective catalytic reduction" (SCR).

SNCR is accomplished by injecting a nitrogenous compound, such as a source of ammonia, into the hot flue gas, and permitting the reduction reaction to occur in the flue gas. U.S. Pat. Nos. 3,900,554, 4,208,386, and 4,325,924 illustrate known types of SNCR applications. SCR is generally accomplished at lower temperatures than SNCR, and necessitates the use of a catalyst, which is placed onto surfaces of catalyst modules, which are positioned within a flue gas stream. U.S. Pat. No. 5,104,629 illustrates one of known types of SCR installation.

It is important to accomplish the reaction of the ammonia and NOx in an efficient manner, for maximum possible reaction of both the NOx and the ammonia. If the reaction is incomplete, either NOx or ammonia (or both) may pass through to the stack and be emitted to the atmosphere. Both NOx and ammonia are classified as pollutants, and their emission is to be maintained within legal limits. Furthermore, depending upon the temperature at the cold end of the air preheater, excess ammonia slip may cause clogging of the space between adjacent air preheater heating elements because of the formation of ammonium sulfate/bisulfate, and/or agglomerated flyash. In addition, many power plants dispose of the collected flyash by selling it to purchasers who further process the flyash for commercial uses (i.e. lightweight aggregate for concrete mixtures). If the amount of ammonia which adheres to the flyash is relatively high (i.e. in excess of 100 ppm, by weight, or as otherwise mandated by users), the flyash may not be able to be sold, and the utility will have to pay for the disposal.

The prior art is replete with ways of preventing or alleviating ammonia slip (i.e. larger SCR units, more responsive control arrangements, early replacement of catalyst, and the like); however, in all instances, some ammonia slip will indeed enter the air preheater. It is specifically to the ammonia slip which enters the air preheater for which the instant invention is directed. In this regard, at the air preheater, very little original thinking has been directed for the last several years, for example: efforts to control or alleviate the effects of ammonium sulfate/bisulfate formation by applying an enamel coating to the air preheater elements, coupled with aggressive sootblowing (an expensive and short lived solution); and efforts to alleviate the ammonia slip by catalyzing the air preheater elements, such as is illustrated in U.S. Pat. Nos. 4,602,673 and 4,867,953 (a concept which to date has not proved economical or practical).

As will be discussed hereinafter in detail, the present invention overcomes, or in the least, greatly alleviates the prior art deficiencies discussed above, in an efficient, cost effective and novel manner.

SUMMARY OF THE INVENTION

The present invention includes an adsorbent compound which is integrally formed with, or adhered to, the exposed surfaces of some of the air preheater heating elements. The adsorbent is selected and structured to act as a molecular sieve to adsorb, or capture, molecular ammonia on the gas side of the air preheater, and to desorb, or release, such captured ammonia on the air side of the preheater. The desorbed ammonia is either destroyed in the boiler fire ball or, in the alternative, is used to destroy NOx in an SNCR and/or SCR stage of the NOx reduction system. The preferred pore size of the adsorbent material will be sufficient to adsorb ammonia (i.e 2.8 Å), but less than 4 Å, so as to prevent $SO_2$ or $SO_3$ penetration. As will be discussed hereinafter in the detailed description of the preferred embodiment, other critical criteria for the application of the existing invention is the selection of preheater layers or partial layers on which elements having adsorbent surfaces will be positioned, as well as the minimum catalytic activity of such adsorbent (i.e. to alleviate the concern for amplifying the potential of ammonium sulfate/bisulfate problems, or creating additional $SO_3$ where perhaps none is required).

In view of the above, it is to be appreciated that an object and advantage of the present invention is to provide a method and apparatus for alleviating the problems of ammonia slip to the environment, by including a means and method for adsorbing excess system ammonia at the gas side of the air preheater and such continually releasing an equilibrium portion of such adsorbed ammonia as the heating elements rotate to the air side of the preheater.

It is another object and advantage of the present invention to lessen air preheater element fouling due to ammonium sulfate/bisulfate deposits.

It is still a further object and advantage of the present invention to address the ammonia slip problem, without catalytic activity occurring in the area of adsorption/desorption.

These and other objects and advantages of the present invention will become more readily apparent upon a reviewing and reading of the following drawings and description in which:

BRIEF DESCRIPTION OF THE DRAWINGS

FIG. 1 is a schematic view of a portion of a power plant flue gas flow system according to the invention;

FIG. 2 is an exemplary schematic view of heating elements illustrating a single element from the hot end layer, intermediate layer, and cold end layer of a heat exchanger, showing the distribution of absorbent materials thereon.

DETAILED DESCRIPTION OF THE INVENTION

FIG. 1 schematically illustrates a fossil fuel burning power plant 10 which utilizes an adsorption/desorption system 12 of the present invention therewithin. A carbonaceous fuel such as coal is combusted with air in a furnace 20 and produces, in addition to power, combustion products contained within the flue gas. The flue gas may contain nitrogen oxides (NOx), fly ash, $SO_2$, $SO_3$, other undesirable pollutants. As shown, the plant 10 includes an SNCR system 14 for reducing NOx within the furnace 20, and an SCR system 16 for reducing NOx downstream from the furnace.

The combustion flue gas exits from the furnace 20 into an exhaust duct assembly 22. The exhaust duct assembly 22 extends from the furnace 20 through a known air preheater 24, typically of the rotary regenerative type. The air preheater 24 is provided to absorb heat on the gas side, and use such absorbed heat to heat incoming air on the air side of the preheater 24. The combustion air is provided by blower 27, and is directed to the furnace 20 through the inlet duct assembly 26. The flue gas passes from the preheater 24 through a suitable cleaning device, such as a baghouse or, as shown, an electrostatic precipitator, schematically illustrated as 28, and is exhausted from the power plant 10 through a stack 30.

The discussion of the power plant 10 is intended to be highly schematic in nature, and it is not deemed necessary to provide more information and background to understand, practice and enable the present invention. In an operating power plant, there are typically many other systems, as well as alternative systems, that are not shown here. The present invention is compatible with such other systems and may, wherever applicable, be used with them.

The level or amount of nitrogen oxides in the flue gas is an important consideration because of present day standards, which severely limit NOx emissions from many fossil fuel burning power generation facilities. To this end, regulations may require the usage of an SNCR system 14, an SCR system 16, or, on occasion, a combination SNCR/SCR system (a staged system, such as is shown in FIG. 1). SNCR and/or SCR systems 14 and 16, respectively are well established, and detailed descriptions thereof are not necessary to one skilled in the art to understand the need for and operation of the instant invention. Furthermore, although the particular schematically illustrated SCR system 16 is of the type which is for limited NOx reduction, the present invention is also compatible with more conventional full scale systems commonly used for 90% + reduction.

A nitrogenous compound, such as urea, in the case of SNCR 14, or ammonia, in the case of SCR 16, is injected into the flue gas stream to convert NOx into free nitrogen and water. In most instances when using SNCR and SCR, a certain amount of ammonia added to the process is not utilized. This excess ammonia is commonly known as "ammonia slip" and, as will be described hereinafter, can result in several problems at the air preheater 24, and downstream thereof. It is particularly to ammonia slip entering the air preheater 24 to which the instant invention is directed.

The air preheater 24 includes a plurality of heating elements 46, which are heated by the passage of the hot flue gas. The elements 46 are positioned, in a known manner, within baskets, or partitions, positioned within the wheel 47 of the preheater 24. Typically, wheel 47 rotatably carries two or more levels of elements 46. In the embodiment illustrated, there is schematically shown three layers, the layer closest to the entry point of the flue gas into the heat exchanger 24 being designated hot end layer 50, the layer at the exit end of the flue gas being designated cold end layer 54, and the middle layer being designated intermediate layer 52.

The wheel 47 of the heat exchanger 24 continuously rotates about its axis 49, which may be oriented either vertically or horizontally, to carry the heating elements 46 from the flue gas side 42 to an air side 48. During such rotation, the heat in the heating elements 46 is transferred to a flow of cool incoming air being provided from blower 27.

FIG. 2 schematically illustrates hot end heat exchange element 46(a), intermediate elements 46(b) and cold end elements 46(c), from layers 50, 52 and 54, respectively. Depending upon operational circumstances, as well as physical and chemical considerations, at least some of the heat exchange elements 46 are coated with an adsorbent. The coated elements 46, in the embodiment illustrated shown as elements 46(a) and 46(b) carry a suitable adsorbent (shown as shaded) on the exposed surfaces thereof. It is noted that the intermediate element 46(b) is illustrated as having absorbent on only one half the height thereof, as exemplary of conditions which are indicative of not applying adsorbent to the entire height. Other conditions may require all or none of element having adsorbent being applied thereto. The adsorbent, which is preferably selected and applied to specific surfaces in accordance with the guidelines discussed below, is operable to adsorb ammonia slip from the flue gas passing thereby, and to desorb an equilibrium portion of the adsorbed ammonia to the combustion air passing thereby as the wheel 47 rotates from the flue gas side 42 to the air side 48. Examples of preferred adsorbent is zeolite, carbon, or a combination of zeolite and carbon. The heating elements carrying the adsorbent may be of any suitable material or configuration, for example: metal; solid metal substrate; expanded metal substrate; and ceramic honeycomb structures where the adsorbing material may be integrated in the mixture used for extruding the honeycomb structure. It is to be noted that by "expanded metal", Applicant is referring to heating elements with increased surface area (i.e. rolled corrugations, notches and the like).

Zeolite is presently the preferred adsorbent. Further, because consistency and uniform pore size is necessary, it is anticipated that a manufactured, rather than a natural zeolite will be preferred in most instances. In this regard, a range of contemplated pore size diameter is 2.8 to 3.8 Å for the zeolite is recommended, with a preferred size of approximately 3.0 Å. Note, the lower end of the above range is selected because ammonia gas, which is to be adsorbed, has a molecular size of 2.8 Å, and the upper range is selected because $SO_2$ and $SO_3$, have a molecular size of more than 4.0 Å. It is highly desired to avoid the adsorption of $SO_2$ or $SO_3$, in order to not amplify the potential problem of formation of ammonium sulfites or sulfates, which plug the adsorbent pores and also have a tendency to clog the flow paths between adjacent heating elements 46.

Several other criteria must be addressed when selecting the proper adsorbent, as well as determining which elements, or layers of elements to preferably apply the adsorbent media. Specifically:

1. The adsorbent should be substantially catalytically inactive in the temperature zone in which it will operate. The primary reason for this is that any catalytic activity will increase the conversion of $SO_2$ to $SO_3$, which in most instances is not a desirable effect. By way of example, the typical temperature of flue gas passing through an air preheater 24 ranges from up to 700° F. at the hot end to 250° F. at the cold end. Also, typical catalytic activity threshold for a V—Ti oxide catalysts is 550 to 750° F.

2. The adsorbent should be applied to elements 46 between the following limits (along the depth of preheater 24):

$T_{min}$ is the low limit defined by the temperature of formation of ammonium sulfate/bisulfate and their deposition on ash particle surfaces. This temperature is a function of $SO_3$ and $NH_3$ concentrations in the flue gas.

$T_{max}$ is the high limit defined by the condition that maximum adsorption capability of the adsorbent for adsorbate partial pressure on the "gas" side and maximum "metal" temperature at this longitudinal location is not less than the maximum adsorption capability for adsorbate partial pressure on the "air" side and minimum "metal" temperature at the same longitudinal location.

It is anticipated that the calculated temperature range, in most instances, will be 700° F. to 300° F., with a preference of 650° F. to 400° F.

3. Another governing factor concerning the placement of adsorbent is that the surface area to which adsorbent is applied, and the amount of adsorbent, should provide a maximum adsorption capability of the adsorbent exposed to the flue gas at any moment at operating adsorbent temperature and the partial pressure of the ammonia in the flue gas, which should be significantly higher (i.e. at least an order of magnitude higher) than the amount of ammonia that should be removed from the gas stream during the time period when an individual adsorbent element is exposed to flue gas.

4. The adsorbing layer should be preferably structured to create a molecular sieve with a consistent selected diameter.

5. The length (depth) of the adsorbing material should be preferably longer than the distance traveled by the concentration wave of the adsorbate in the longitudinal direction during the time of adsorbent exposure to the flue gas to avoid a breakthrough of ammonia to a cooler zone of the air preheater 24, even through a small angular portion of the gas side sectors.

6. The adsorbent should preferably be hydrophobic and water resistant to allow for cleaning of the air preheater 42 by water washing and also to withstand the occurrence of occasional tube leaks. If desired, the adsorbent may be a hydrophobic zeolite having a high Si/Al ratio.

7. Preferably, the adsorbent will be selected from a group of materials whose specific storage capacity for ammonia in the operating temperature and partial pressure range is more sensitive to pressure variations than to temperature variations. In this regard, the adsorbing material should be applied to those layers of the preheater 24 where the effect of the "metal" temperature swing on the specific storage capacity for ammonia is overcompensated by the effect of ammonia partial pressure swing.

8. The adsorbing material should preferably be selected from a group of adsorbents efficient in the temperature range of 300–700° F., and partial pressure of ammonia of $10^{-6}$–$3\times10^{-5}$ bar.

Although a particular embodiment of the invention has been described in detail for purposes of invention, various modifications may be made without departing from the spirit and scope of the invention, for example: alternative adsorbent substrates are anticipated, such as a honeycomb structure; depending upon conditions, perhaps only the hot end or intermediate layer of the elements 46 will be coated with an adsorbent compound, or perhaps only part of the hot end or intermediate layer elements will be coated; if deemed appropriate to reduce the metal temperature swing, and increase the ammonia transfer potential, it may be desirable to consider increasing the heat capacity of the heating element carrying adsorbent, by increasing its thickness; and the like. Accordingly, the invention is not to be limited except as by the appended claims.

What is claimed is:

1. In a system for reducing ammonia slip in SCR and/or SNCR NOx removal applications and wherein a nitrogenous compound is injected into the flue gas stream to promote removal of NOx in specific SCR and/or SNCR reduction areas, and at least some of such nitrogenous compound, in the form of gaseous ammonia, slips past such reduction areas and enters a regenerative air preheater which rotates between a flue gas side and a combustion air side, such air preheater including a plurality of heating elements therein, which are alternately exposed to such flue gas and such combustion air during the heating elements rotation, to effect a heat transfer therebetween, the improvement comprising:

at least some of said heating elements incorporating a principally adsorbent media on the surfaces thereof;

said adsorbent media being physically structured and optimized to, during normal continuous operation of such a system, adsorb at least a portion of such ammonia slip on said flue gas side, and to desorb, on said combustion air side, substantially the same amount of ammonia slip adsorbed on said flue gas side; and the composition of said adsorbent media being relatively inactive as a catalyst in the temperature range in which it is exposed to the flue gas during the normal continuous operation of such a system.

2. A system as specified in claim 1 wherein the composition of said adsorbent media being inactive to promote the oxidation of $SO_2$ in the flue gas stream passing thereby to $SO_3$.

3. A system as specified in claim 1 wherein said media is selected from a group of adsorbents efficient in the temperature range of 300 to 700° F., and partial pressure of ammonia of $10^{-6}$ to $3\times10^{-5}$ bar.

4. A system as specified in claim 3 wherein said media is selected from a group consisting of zeolite, carbon, or a mixture of zeolite and carbon.

5. A system as specified in claim 1 wherein said adsorbent media presents an open solid structure with pores of substantially uniform size.

6. A system as specified in claim 5 wherein the pore size of such media is in the range of approximately 2.8 to 3.8 Å, preferably approximately 3.0 Å.

7. A system as specified in claim 5 wherein said adsorbent media should be structured to create a molecular sieve, with a characteristic diameter similar to 3.0 Å.

8. A system as specified in claim 1, with said elements having a depth in the direction of the gas flow, and said adsorbent media only being incorporated on said surfaces where the temperature of the flue gas passing thereby is in the range of 650° F. to 400° F.

9. A system as specified in claim 1 wherein said heating elements are positioned in at least hot and cold end layers, and the elements in the cold end layer do not incorporate an adsorbent media on the surfaces thereof.

10. A system as specified in claim 9 including hot, intermediate and cold end layers of said heating elements, wherein at least portions of at least some of the heating elements of said intermediate layer include adsorbent media thereon.

11. A system as specified in claim 10 wherein adsorbent media is installed primarily only on said heating elements of the intermediate layer.

12. A system as specified in claim 1 wherein said heating elements used as a carrier for such adsorbent are metal.

13. A system as specified in claim 12 wherein said metal heating elements present a solid metal substrate for such adsorbent.

14. A system as specified in claim 12 wherein said metal heating elements present an expanded metal substrate for such adsorbent.

15. A system as specified in claim 1 wherein said heating elements carrying adsorbent are ceramic honeycomb structures, and the adsorbing material is integrally formed with said honeycomb structure.

16. A system as specified in claim 1 wherein said adsorbent is a hydrophobic zeolite having a high Si/Al ratio.

17. In a method of reducing ammonia slip in SCR and/or SNCR NOx removal applications from a flue gas stream, which flue gas stream is directed from a burner, through a duct assembly and through a rotary regenerative heat exchanger of the type which includes a plurality of heating elements carried in baskets to absorb heat from the flue gas stream passing thereby and release such heat to the incoming combustion air stream, and wherein at least a portion of NOx in such flue gas stream is reduced, upstream of the heat exchanger, in the presence of a nitrogenous compound, and at least some gaseous ammonia from such nitrogenous compound slips by the reduction areas, the improvement in reducing the amount of ammonia slip passing to the environment comprising the steps of:

adsorbing at least some of such gaseous ammonia slip on adsorbent surfaces of certain of such heating elements as the flue gas passes thereby;

desorbing ammonia, during continuous operation, into the combustion air passing by such certain heating elements, in an amount substantially equal to the amount adsorbed during said adsorbing; and and during said adsorbing, minimizing the catalytic oxidation of contaminants in the flue gas, passing through the zone of adsorption.

18. A method as specified in claim 17, wherein said adsorbing occurs while the temperature of the flue gas passing by the adsorbent surfaces is in the range of 700° to 300° F.

19. A method as specified in claim 17, wherein said adsorbing occurs while the temperature of the flue gas passing by the adsorbent surfaces is in the range of 650° to 400° F.

20. A method of reducing ammonia slip to the atmosphere from a flue gas stream treated by means incorporating a nitrogenous compound to reduce NOx contaminants, comprising the steps of:

passing such flue gas stream through the gas side of a rotary regenerative heat exchanger having a gas side and an air side, and heating elements having adsorbent surfaces; simultaneous with said passing, adsorbing at least a portion of such ammonia slip on such surfaces;

passing a combustion air through such heat exchanger on the air side and simultaneously desorbing ammonia from such surfaces in an amount substantially equal to the amount adsorbed on the gas side during each respective rotation;

and during said adsorbing, minimizing the catalytic oxidation of contaminants in the flue gas passing through the zone of adsorption.

\* \* \* \* \*